United States Patent [19]
Söllner et al.

[11] Patent Number: 4,592,208
[45] Date of Patent: Jun. 3, 1986

[54] HEATING OR COOLING APPARATUS

[76] Inventors: Robert Söllner; Robert Söllner, both of Sieglstrasse 15, A-6200 Jenbach, Austria

[21] Appl. No.: 734,824

[22] Filed: May 16, 1985

Related U.S. Application Data

[63] Continuation of Ser. No. 459,593, Jan. 20, 1983, abandoned.

[30] Foreign Application Priority Data

Feb. 3, 1982 [WO] PCT Int'l Appl. .................. PCT/AT82/00003

[51] Int. Cl.⁴ ............................................. F25B 27/02
[52] U.S. Cl. ................................ 62/323.1; 123/198 E; 165/51
[58] Field of Search ................... 62/323.1, 323.4, 243; 165/51; 123/198 E, 2

[56] References Cited

U.S. PATENT DOCUMENTS

| | | | |
|---|---|---|---|
| 2,213,733 | 9/1940 | Nicke | 62/323,1 X |
| 2,257,975 | 10/1941 | Miller et al. | 165/51 X |
| 2,282,878 | 5/1942 | Newton | 62/323.1 X |
| 2,286,316 | 6/1942 | Snook | 62/323.1 X |
| 3,341,081 | 9/1967 | King | 165/51 X |
| 3,949,726 | 4/1976 | List | 123/198 E |
| 4,071,008 | 1/1978 | Skatshe et al. | 123/198 E |
| 4,137,888 | 2/1979 | Allan | 123/198 E |
| 4,194,484 | 3/1980 | Kirchweger et al. | 123/198 E X |
| 4,203,407 | 5/1980 | Fachbach et al. | 123/198 E |
| 4,226,214 | 10/1980 | Palazzetti | 123/198 E X |
| 4,241,702 | 12/1980 | Takeuchi et al. | 123/198 E X |
| 4,324,208 | 4/1982 | Danckert et al. | 123/198 E X |
| 4,438,733 | 3/1984 | Sasaki | 123/198 E X |

Primary Examiner—William E. Tapolcai
Attorney, Agent, or Firm—Wenderoth, Lind & Ponack

[57] ABSTRACT

A heating or cooling apparatus which is enclosed in a housing, having a compression heat pump and an absorption heat pump which are selectively drivable by an internal combustion engine (1) and an electric motor (6), is described. The housing is in the form of a double-walled heat storage means (17), with a heat carrier being stored between the inner and outer walls thereof. The internal combustion engine (1) is insulated from the working medium of the heat pump by the internal combustion engine (1) being enclosed in an engine enclosure (11).

7 Claims, 11 Drawing Figures

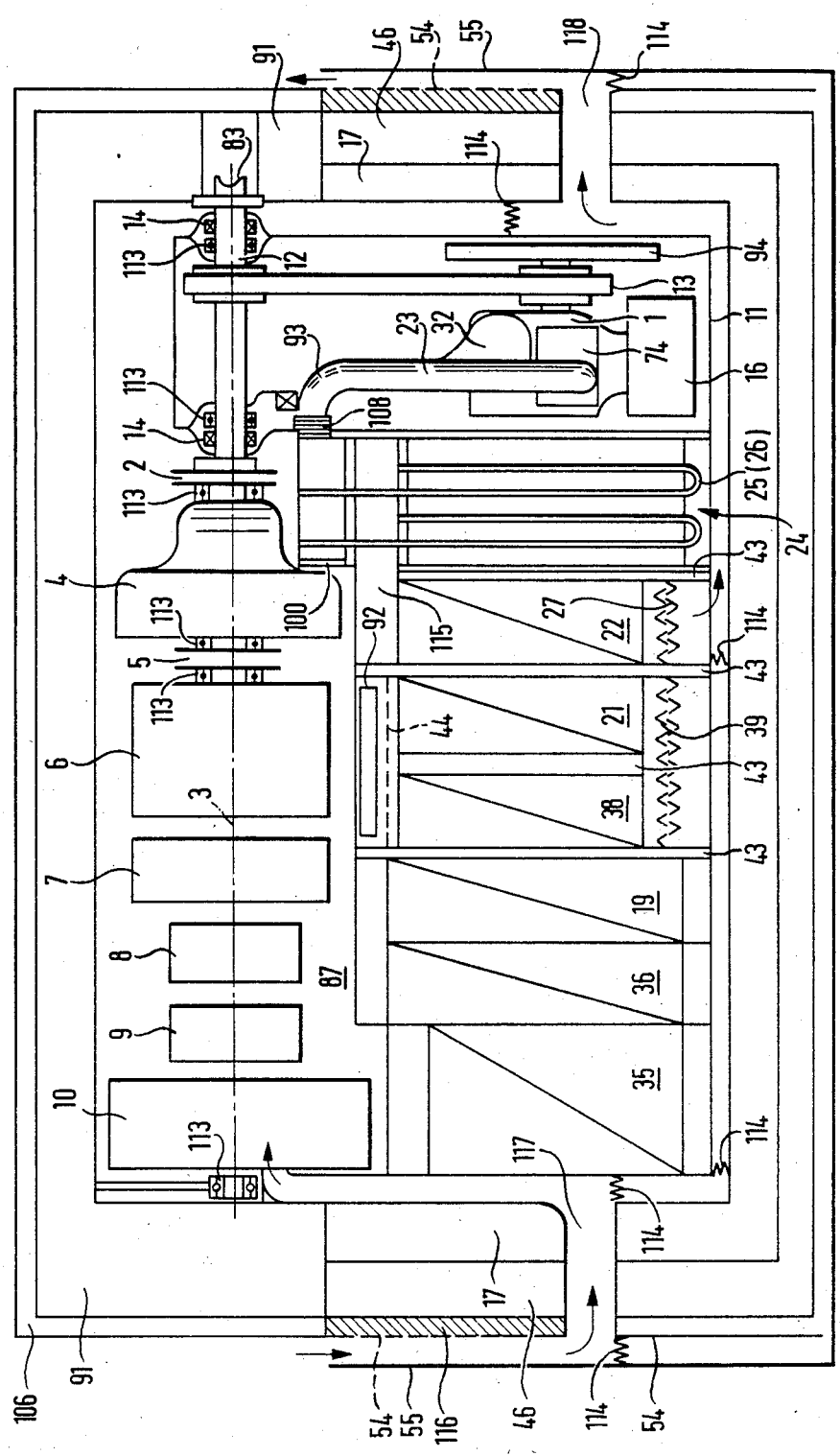

HEATING OR COOLING APPARATUS

This application is a continuation of now abandoned application Ser. No. 459,593, filed Jan. 20, 1983, now abandoned.

FIELD OF THE INVENTION

The invention relates to a heating or cooling apparatus which is enclosed in a housing, having at least one heat pump which can be driven by an internal combustion engine, wherein a heat carrier transfers heat from the engine and heat pump or pumps to a heating circuit.

CHARACTERISTICS OF THE KNOWN STATE OF THE ART

Compression-type heat pumps are known, both with drive by means of internal combustion engines and also by means of electric motors.

It has also already been proposed (see DOS No. 27 28 273) for a generator to be driven by way of an internal combustion engine, the generator putting the motor under load by way of a resistance heating means.

It is also known to make use of the waste heat from an internal combustion engine, by means of cooling water and waste heat exchangers, and in particular cases even by the heat exchangers being incorporated into the circuit of an absorption-type heat pump.

In order to improve the heating performance, that is to say, the ratio of the heat produced to the heat supplied in the compression or absorption-type heat pump, the arrangement of an additional burner in conjunction with an exhaust gas heat exchanger of the internal combustion engine has also already been proposed.

OBJECT OF THE INVENTION

A substantial part of the construction cost of such apparatuses is incurred in insulating means of various kinds. In accordance with DOS No. 30 14 357, that cost may be substantially reduced by providing that the housing is in the form of a double-walled heat storage means, wherein a heat carrier is stored between the inner and outer walls of the vessel and from there goes to the coolant circuit of the engine and to the refrigerant circuit of a compression heat pump, which are disposed in the space enclosed by the inner wall of the heat storage means.

The invention is based on the discovery that, in the known apparatuses, either each individual unit has been insulated against the conduction of sound and heat, which involves a high level of construction cost, or all units have been jointly screened relative to the exterior, with the result that escaping refrigerant damages other units, in particular the internal combustion engine.

SUMMARY OF THE INVENTION

According to the invention, the above-indicated disadvantage may be avoided by the internal combustion engine being insulated relative to the heat pump or pumps by a gas-tight engine enclosure or container which encloses the internal combustion engine including the crankshaft and through which a centrally mounted output shaft passes at least once.

Arranging the internal combustion engine in a separate enclosure, in accordance with the invention, first makes it possible for the engine itself to be of a particularly simple constructions. Also, in addition to the engine the engine enclosure may accommodate a lubricant supply therefor, wherein the lubricant can also be used in a known manner for cooling the engine.

It is particularly advantageous for the engine enclosure to ensure a sealing action relative to the operating means of the heat pumps, whereas thermal and sound insulation relative to the exterior is effected in a known manner, by the heat carrier being disposed in the wall arrangement of the housing enclosing all units. In that manner, not only does the heat storage means which is required in any case additionally perform the function of sound and heat insulation, but in addition the arrangement provides for a clear separation of the circuits of the heat pumps and the engine from the heat storage means, so that the drive units and heat exchangers which are disposed in the interior of the heat storage means can be of a simple design, can be interconnected and can be easily fitted and removed. Because the heat exchangers of the engine and the heat pumps, such heat exchangers being arranged in the interior of the heat storage means, have the heat carrier flowing therethrough in succession, the heat exchangers may be arranged in such a way as to avoid any contact between the operating means of the heat pumps and the drive engine, which is an absolutely essential condition for the engine to operate over a prolonged period of time.

DESCRIPTION OF THE DRAWINGS

Further features of an invention will be described hereinafter with reference to the drawings in which:

FIG. 11 is a diagrammatic view showing the arrangement of the units of the entire apparatus, relative to each other.

DESCRIPTION OF PREFERRED EMBODIMENTS

Figure 1:
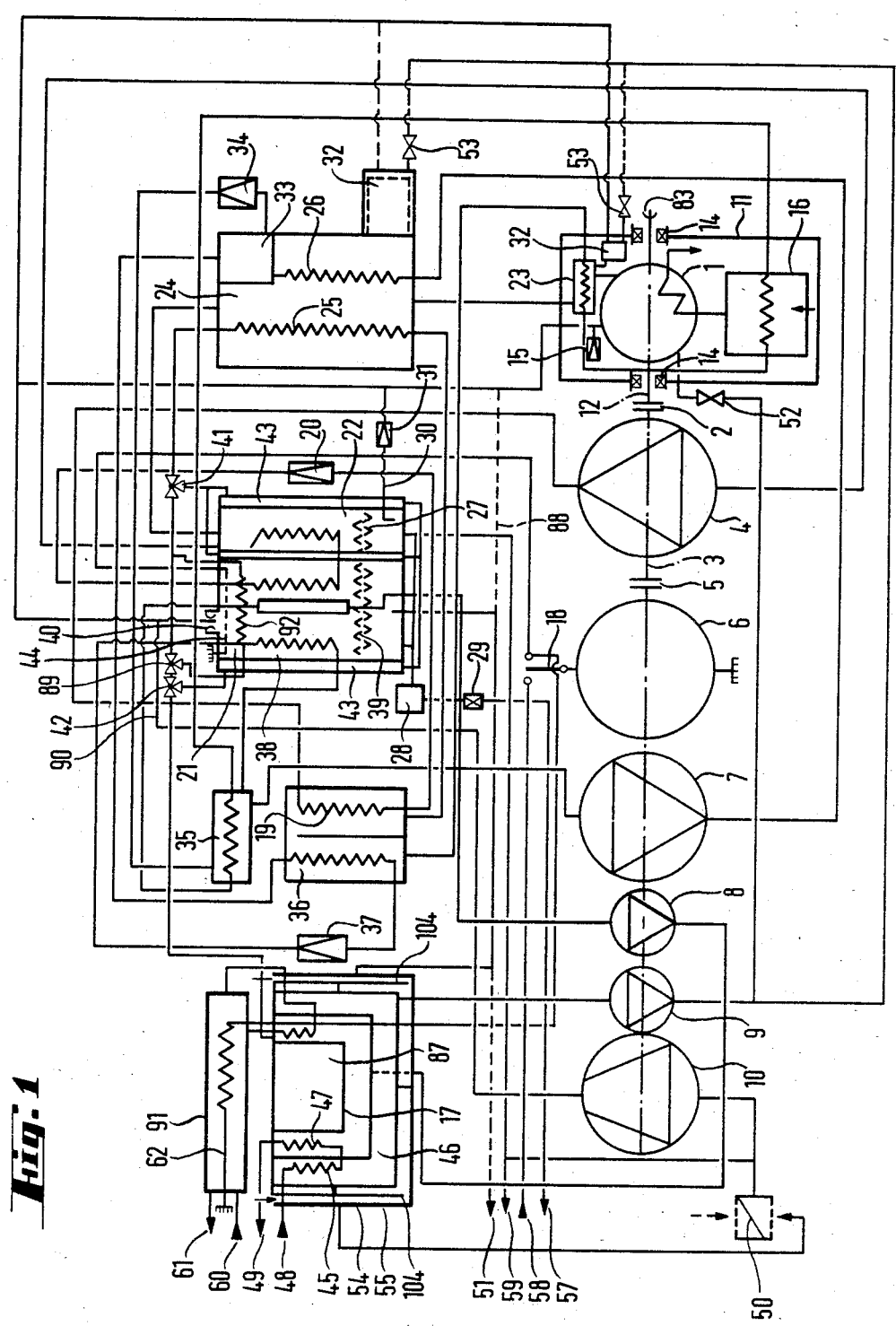
FIG. 1 is a circuit diagram of an embodiment of the invention.

FIG. 1 shows a circuit diagram when the apparatus of the invention is used for heating purposes.

The machine is preferably driven by an internal combustion engine 1 which is connected to a shaft 3 by way of a clutch 2. A compressor 4 for the refrigerant of a compression heat pump, a further clutch 5, an electric motor 6, a solution pump 7 for the pair of substances of the absorption heat pump, at least one circulating pump 8, if necessary a fuel pump 9 and at least one blower 10 are force-lockingly incorporated into the shaft 3. If necessary, for design reasons, the arrangement may include an intermediate transmission means (not shown) which increases the speed of rotation of at least a part of the driven machines, relative to the driving machines.

Figure 2:
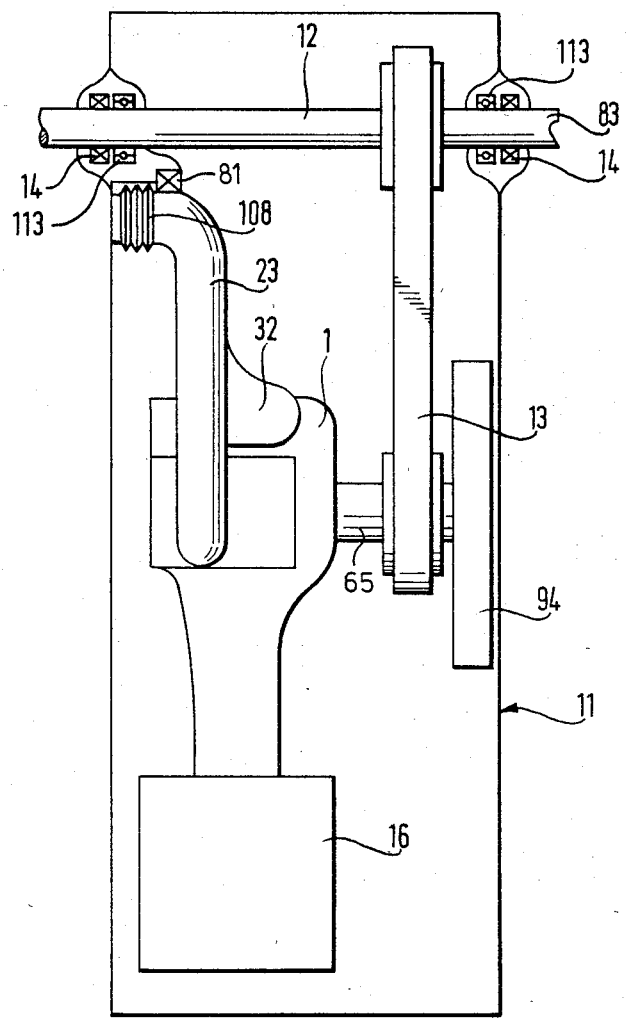
FIG. 2 is a diagrammatic side view of an internal combustion engine.
Figure 3:
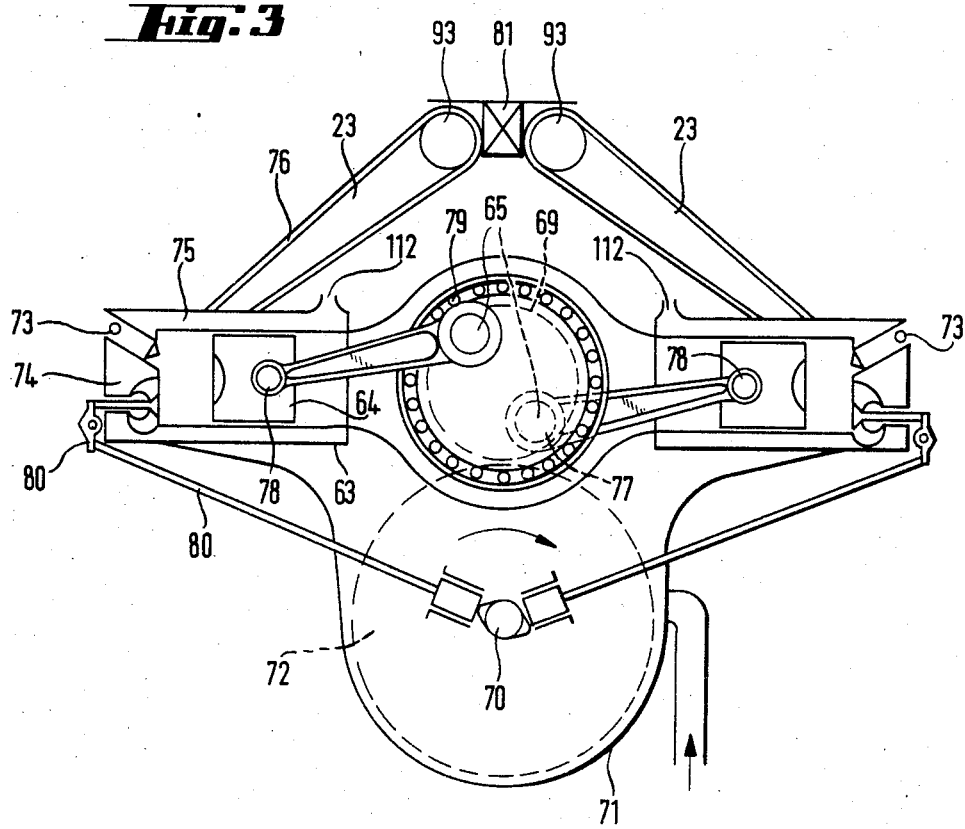
FIGS. 3 and 4 respectively are a partly sectional front view and a plan view of the engine of FIG. 2, FIGS. 5 to 7 are partial elevation views of alternative forms of an exhaust gas pipe with an additional burner.
Figure 4:
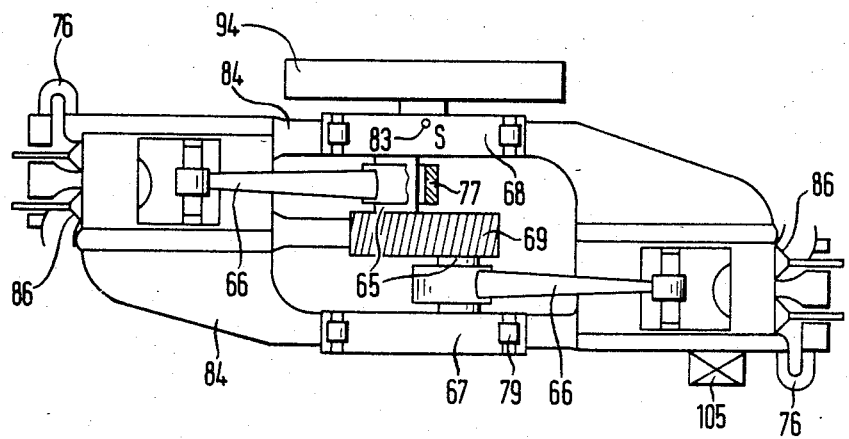

The internal combustion engine 1 (see FIGS. 2 to 4) is disposed in a gas-tight engine container or enclosure 11 which has one, or if need be two shaft sealing means 14, only at the location or locations at which a motor output shaft 12 passes through the enclosure 11. All other means at which conduits pass through the enclosures are of the fixedly screwed type. In order for the shaft sealing means 14 to have a long service life, in a particular configuration in accordance with the invention, the transmission of power to the output shaft 12 is provided by an elastic element 13 so that the shaft sealing means 14 seals a shaft which performs a purely rotary movement, and is not required to seal the location at which a crankshaft passes through the enclosure, a crankshaft always having a wobble motion, even if only slight. In addition, when the internal combustion engine 1 is operating, any gas which leaks from the cylinder or cylinders 63 in small amounts is trapped in enclosure 11, and if the pressure therein reaches a certain pressure, the trapped gas is returned to the engine by a throttle 15. Therefore, no mixture of substances can penetrate into the housing 11 from the space 87. That is particularly important from the point of view of the service life of the internal combustion engine 1.

In a particular embodiment of the invention, the engine enclosure 11 includes a lower portion which is of increased size relative to the known constructions and which contains a supply of lubricant oil for at least one year's operating time. The supply of lubricant oil also serves as a heat storage means and keeps the operating temperature constant within closer limits than is usual in known engine constructions. That fact also has an advantageous effect on the wear and thus also on the service life of the internal combustion engine 1. Disposed in the lower portion of the engine enclosure 11 is a lubricating oil heat exchanger 16 through which flows on the one hand engine lubricating oil and on the other hand the heat carrier of a heat storage means 17. The heat carrier is taken from the lower portion, which is cooler as a result of the temperature layering effect, of the heat storage means 17. When the heat storage means 17 is heated up, an automatic control stops the heat machine. Therefore, the internal combustion engine 1 can be neither overheated nor excessively cooled. The lubricating oil serves not only for lubrication but also for cooling the internal combustion engine 1 (see FIG. 1). Therefore, in FIG. 1, the internal combustion engine 1 is also shown as a heat exchanger.

The internal combustion engine 1 is started by means of the electric motor 6 when a change-over switch 18 is connected to an electrical main terminal 58 and when the clutches 2 and 5 are closed. In order to reduce the current surge when the electric motor 6 is switched on, provision is made for switching in ohmic resistors in a per se known manner. They are provided by a preheater grid or grill 44 and an industrial-use water auxiliary heater 62.

If the clutches 2 and 5 remain closed after the electric motor 6 starts, the compressor 4, and the machines 7, 8, 9 and 10 which are drivingly connected to the shaft 3, and the electric motor 6 which is in a no-load condition are driven. The compressor 4 starts the circuit of a compression heat pump operation, that circuit being closed by way of a condensor portion 19 for the compression heat pump, a throttle valve 20, an evaporator portion 21 for the heat source, for example outside or ambient air, and an evaporator portion 22 for the internal combustion engine exhaust gas.

As soon as the internal combustion engine 1 is running under a sufficient load, on the one hand it gives off heat by way of the lubricating oil to the lubricating oil heat exchanger 16 and also by way of its cooled exhaust pipe 23 to the heat carrier of the heat storage means 17, while on the other hand its hot exhaust gas is greatly cooled down in an exhaust gas heat exchanger 24. The heat which is generated in that situation is transferred to the heat carrier of the heat storage means 17 or to the expeller or ejector of the circuit of the absorption heat pump, according to whether it is applied to an exchanger surface 25 or an exchanger surface 26. The exhaust gas is passed through the evaporator portion 22 for exhaust gas, and there preferably cooled down to below the dew point. The condensate which is formed is passed from a water separator or trap 27 into a condensate vessel 28 and from there discharged to the exterior by way of a condensate valve 29. In being discharged in that way, the condensate removes water-soluble noxious substances such as for example nitrogen oxides, and thus reduces the proportion of noxious substances in the exhaust gas. A part of the dewatered exhaust gas, that part being adjustable quantitatively by a throttle means 31, is mixed again with the combustion air by a branch conduit 30 and the adjustable throttle means 31 and fed to the internal combustion engine 1. This per se known method of recycling cooled exhaust gas also reduces the formation of noxious substances upon engine combustion. The remainder of the exhaust gas which is cooled below the dew point is selectively passed to an exhaust 59 or, in order to make further use of the exhaust gas heat, in part, added again to the fresh or ambient air which is drawn in by the blower 10. When that method is used, recycling of cooled exhaust gas through the branch conduit 30 is possibly omitted.

Figure 8:
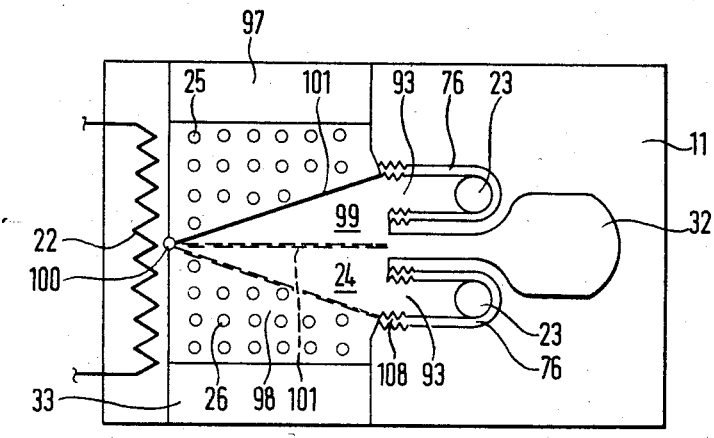
FIG. 8 shows an exhaust gas heat exchanger from above in horizontal section through the pre-chamber.
Figure 9:
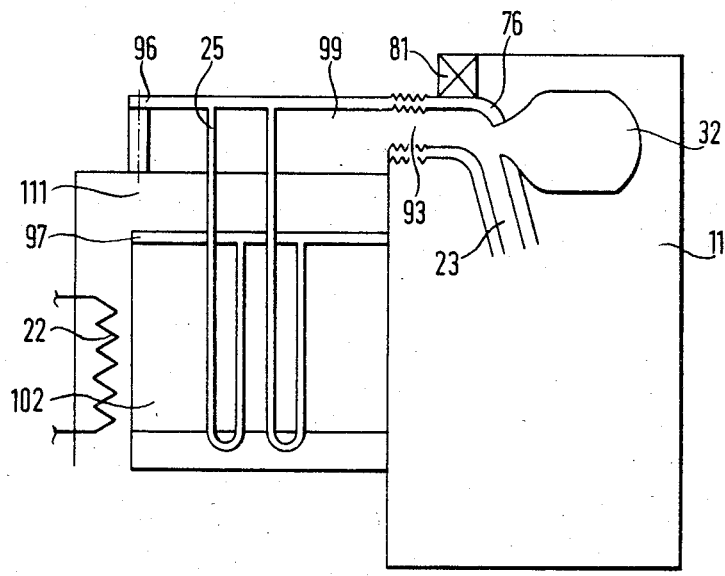
FIGS. 9 and 10 are vertical sections of the FIG. 8 arrangement.

In order to be able to make use of the exhaust gas heat even better than by heat exchange, it is provided that a multiple function be attributed to the exhaust gas heat exchanger 24. FIGS. 1, 8 and 9 show that the cooling surfaces 25 and 26 which receive the exhaust gas heat can be selectively supplied with heat, more particularly, both by means of the exhaust gas from the internal combustion engine 1 and also by exhaust gas from an auxiliary burner 32.

In the exchanger surface for the ejector or expeller, as indicated at 26, with a separator or trap 33 disposed downstream thereof, the pair of substances flowing in the circuit of the absorption heat pump is split up by the application of heat into the liquid portion, for example water, and the gaseous portion, for example ammonia. The liquid portion is passed by way of a throttle valve 34 to an absorber 35 where the temperature thereof drops, with heat being given off to the relatively cold heat carrier from the lower portion of the heat storage means 17, to such an extent that the gaseous portion which is supplied separately can be redissolved, with the temperature of the resulting solution dropping further. The gaseous portion is passed from the separator 33 to the condenser of an absorption heat pump circuit 36 where it gives off heat to the heat carrier of the heat storage means 17. Its pressure is then reduced in a throttle valve 37, and at the same time the temperature is lowered. In that expanded and cooled condition, the gaseous portion of the pair of substances, for example ammonia, flows through the evaporator of an absorption heat pump circuit 38 where it receives heat from the heat source, for example air. In the re-heated condition, the gaseous portion flows to the absorber 33 where it is re-dissolved in the liquid portion. The solution is fed to the solution pump 7 which conveys it to the expeller surface 26, with the pressure thereof being increased.

The air which is preferably cooled to below the dew point in the evaporator means 21 and 38 loses condensate which, together with the condensate from the evaporator means 22 for exhaust gas, flows away into the condensate container 28 by way of a condensate separator or trap 39. The cooled waste air is discharged to the exterior. It is in accordance with the concept of the present invention for air for combustion in the internal combustion engine 1 to be taken from that waste air duct, as long as it is ensured that it cannot contain any constituents from the heat pump circuits, which are harmful to the internal combustion engine. That presupposes that the heat exchangers in the evaporator, through which flow refrigerant or the gaseous portion of the pair of substances, are absolutely fluid-tight. A circuit 88 for taking off the air is shown in broken lines. The purpose of that arrangement is to improve the breathing of the engine and thus its power output, and to prevent the formation of carbon upon combustion. The arrangement also provides incorporating an injector nozzle 40 into the air feed conduit 90 upstream of the evaporator means 21 and 38, the injector nozzle sucking air from space 87 of the heat machine and promoting venting of and air circulation in the space 87. In that resepct, the heat which is produced in the space 87 by radiation and convection is profitably utilised by the evaporator means 21 and 38. It is also in accordance with the present invention for a special blower to be mounted on the shaft 3, for venting and circulating air in the space 87.

The heat storage means 17 has two connections 48 and 49 for the feed and return of the heating installation with heat exchanger 47, two connections for the feed and return for the industrial-use water container 91 with heat exchanger 92, and two connections for the circuit of the heat carrier in the heat machine. In addition, there are possibly connections for the feed of waste heat from other equipment, for example from solar collectors.

From the lower portion of the heat exchanger 17, the heat carrier flows through the following pieces of equipment, with the temperature rising in steps:
  the absorber 35 in the absorption/heat pump circuit,
  internal cooling of the internal combustion engine 1 by way of the heat exchanger 16,
  the cooled exhaust pipe 23,
  condensor means 36 and 19,
  exhaust gas heat exchanger 25,
  three-way valves 41 and 42,
and terminates in the upper, warmer part of the heat storage means 17.

By switching over the three-way valves 41 and 42, for de-icing the evaporator, the heat carrier can be passed by way of the heating jacket 43 which eliminates any ice formed on the walls thereof.

In addition, if necessary, in order to assist in the de-icing operating, the electric motor 6 may be used as a generator and, after the position of the switch 18 is reversed, heats up the electrical preheater grid or grill 44. It is also in accordance with the aim of the present invention for the preheater grid or grill 44 to be used as a load resistance for the electric motor 6 when used as a generator, and thus also for the internal combustion engine 1. More particularly, if the outside temperature drops to a very low level, when using air as the heat source, the load on the internal combustion engine 1 is reduced, and thus also is its output. Because of that, and in addition due to the greater temperature differences between the heat source and the heat carrier, the heating performance becomes worse. It is therefore particularly advantageous for the above-mentioned temperature difference to be reduced by electrical pre-heating means. However, it is also in accordance with the present invention for a heat exchanger 45 to be incorporated to produce the preheating effect and if required to be supplied with hot fluid, for example the heat carrier. It is switched into the heat carrier circuit by way of a three-way valve 89.

The heat storage means 17 is preferably surrounded by a fuel tank 46 instead of thermal insulation. The feed 48 of the heating system flows through heat exchanger 45 in the fuel tank 46. Therefore, the fuel itself and also the outside wall of the fuel tank 46 are maintained, at a relatively low temperature. When the fuel tank 46 is partly emptied, the resulting air space acts as an insulating layer.

The feed connection 48 therefore leads to the heat exchanger 45, a heat exchanger portion 47 disposed in the lower part of the heat storage means 17, and finally, a heat exchanger portion 47 which is disposed in the upper, hotter part of the heat storage means 17. The return connection 49 of the heating system is connected to the heat exchanger portion.

From the point of view of maintenance and service life of the heating connections, it is advantageous if no external systems are connected to the individual pieces of equipment, that is to say, the conveyance of heat within the system is effected by a closed heat carrier circuit. However, it is also in accordance with the present invention for a substance at a lower temperature, for example hot water at the feed temperature, to flow through individual devices, for example the absorber 35.

In heat machines which use air as a heat source, the supply of combustion air is preferably from the open circuit of the heat source. It begins at a change-over flap valve 50 for fresh air or ambient air and goes by way of the blower 10 to the evaporator means 21 and 38 with the above-mentioned take-off conduit 88 for the combustion air for the internal combustion engine 1 and the auxiliary burner 32. The exhaust or waste air is discharged to the exterior through an exhaust air opening 51 or between the casing 54 of the fuel tank 46 and the jacketing or enclosure 55.

When for example water is used as the heat source, the blower 10 is of a correspondingly smaller construction and serves to supply the heat machine with combustion air and also to vent the space in which the apparatus is disposed. The water of the heat source flows through the evaporator means 21, 22 and 38, while it will be appreciated that the condensate separator 39 and the take-off conduit 88 are omitted.

If the fuel is available in liquid form and not under pressure, the fuel is taken from the fuel tank 46 and passed to the internal combustion engine 1 or the auxiliary burner 32 as required by fuel pump 9 by way of shut-off valves 52 and 53.

On its outside, the fuel tank 46 is entirely or partially clad with casing 54 of poor heat-conducting and sound-absorbing nature. It is extended downwardly, in the region of the jacketing 55 which serves as a collecting or catch tank, in the form of a double wall 104, almost to the bottom of the jacketing 55. The double wall 104 also serves as a heat barrier arrangement. Jacketing 55 is fluid-tight downwardly and at the lateral surfaces. The intermediate space preferably serves as a suction-intake and blow-out noise damper for fresh air and exhaust air, and can be seen from FIG. 1, and also, in need or in an emergency, as a collecting vessel for fuel which may escape for example from a leaking part of the fuel system. For that reason, the connections for feed air and exhaust air are disposed at a correspondingly higher level.

In particular in order to give good balance, the internal combustion engine 1 preferably has two cylinders 63 in a boxer or horizontal oppositely disposed configuration, that is to say, with pistons 64 moving in opposite directions, a crankshaft 65, two connecting rods 66 and a flywheel 94. In an embodiment given by way of example, the crankshaft 65 includes three circular crank webs 67, 68 and 69, of which webs 67 and 68 serve as inner rolling tracks or race members for, for example, respective cylindrical roller bearings acting as main bearings 79, while the middle crank web 69 is formed as a drive gear for a cam shaft 70 and an oil pump gear 72.

The oil pump gear 72 rotates in an oil pump casing 71 which force-lockingly connects the, for example, two cylinders 63. The lubricating oil which is sucked in by the lubricating oil heat exchanger 16 is fed through the oil pump casing 71 which is in the form of a hollow rib structure to the cylinders 63 where it passes into the cylinder heads 74, preferably through the nozzle holder or holders 73, and from the cylinder head flows into a cylinder cooling jacket 75. The oil flows back into the oil sump under free flow conditions from the highest point in the engine. This means that the cooling system of the internal combustion engine 1 can never be dry.

Connecting rod bearings 77 are preferably supplied with oil by way of bores in the crank web 69 and the crankshaft 65 while cam shaft bearings (not shown) are supplied with oil by way of bores in the oil pump gear 72 and the cam shaft 70. All the remaining parts of the mechanism such as pistons 64, connecting rod end bushes 78, main bearings 79 and valve actuating mechanism 80 are lubricated by spray oil.

The exhaust gas pipes 23 which are cooled by the heat carrier, by the cooling jacket 76, also serve as the engine mounting arrangement, for which purpose a resilient member 81 is arranged above the centre of gravity of the engine. Transverse forces as may occur in particular when the internal combustion engine 1 is starting up and when it is slowing down to stop are absorbed in a per se known manner by at least one further resilient member. In a particular construction in accordance with the invention, the exhaust gas pipe is of such a length that promotes the change of cylinder charge in the cylinders 63 and, acting as a diffuser, reduces the flow speed before the gas passes into the exhaust gas heat exchanger 24. The intake openings 93 for exhaust gas are embraced by the conduction or transfer effect of the heat carrier or the cooling jacket 76, for example by means of two concentrically arranged compensators. The output shaft 12 has a starter dog 83 for hand starting the internal combustion engine 1 by way of the power transmission means 13, whereby the heat machine is made independent of the mains.

In the embodiment illustrated by way of preferable example, the internal combustion engine 1 has neither a crank case nor a cooling jacket or casing for a special cooling fluid. The structure of the engine, which is of extremely simple form, therefore comprises only at least one and preferably three rib structures, namely the oil pump casing 71 two rib structures 84 carrying the main bearings 79.

It is also in accordance with the present invention for the flywheel 94 to be in the form of the armature of the electric motor 6, in which case it will be appreciated that some advantages with regard to selection of the drive assembly, as indicated hereinbefore, would have to be foregone.

The engine exhaust gases pass through the exhaust gas intake openings 93 into the exhaust gas heat exchanger 24.

The combustion air is supplied by the conduit 88 shown in the diagrammatic view in FIG. 1.

Figure 5:
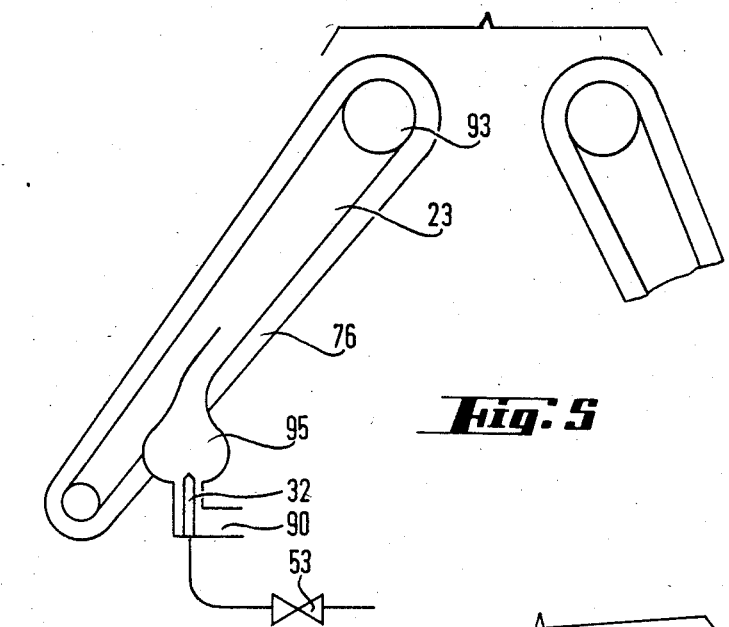
Figure 6:
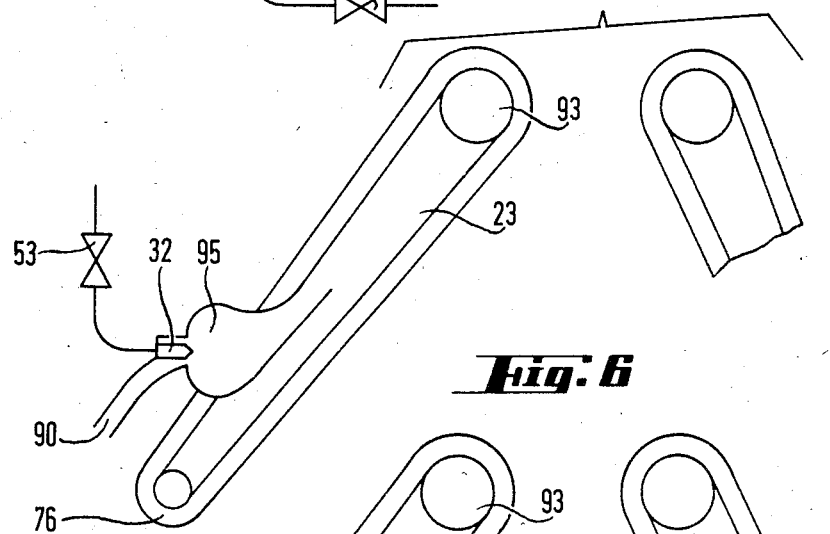
Figure 7:
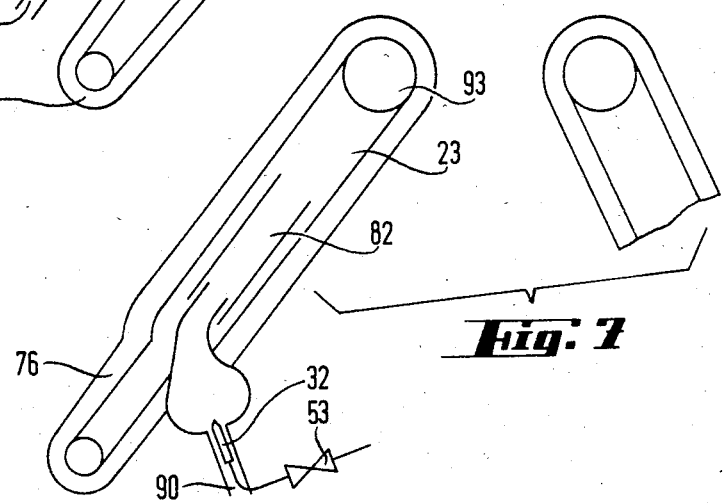

In a further embodiment of the invention, at least one cooled exhaust pipe 23 is used as a post-combustion chamber for the auxiliary burner 32, for which purpose it is particularly suitable, by virtue of its length. FIGS. 5, 6 and 7 show arrangements by way of example. Therefore, at least one cooled exhaust pipe 23 has a combustion chamber 95 fitted thereto, a branch conduit from an air feed conduit 90 and a fuel pipe, downstream of the shut-off valve 53, communicating with the combustion chamber 95. The ignition means is not illustrated.

The flame which is produced in the combustion chamber 95 is preferably introduced parallel to the flow of exhaust gas, with a corresponding increase in the sectional area of the exhaust pipe. The length of the exhaust pipe, which promotes the change in cylinder charge in the internal combustion engine 1, likewise permits free development of the burner flame and complete combustion of the fuel including any unconsumed fuel particles which may still be contained in the engine exhaust gas. Optionally, it is also possible for each of the, for example two, cooled exhaust pipes 23 to be provided, in a correspondingly similar construction, with respective auxiliary burners and combustion chambers 95 which are supplied with the same fuel or, with order to give a higher degree of certainty in regard to the supply of heat, different fuels.

In a preferred embodiment of the invention, the exhaust gas heat exchanger 24 is combined with the engine enclosure 11 and the exhaust gas evaporator means 22, that is to say, also with the evaporator means 21 and 38, in order to avoid using resilient sealing arrangements. FIG. 9 shows an arrangement, given by way of example, of the manner of introducing the cooled exhaust gas pipe 23 with cooling jacket 76 into the exhaust gas heat exchanger 24, wherein the separating wall or partition is preferably screwed to the wall of the engine enclosure 11.

The intake openings 93 and the mouth opening of an auxiliary burner 32, which is possibly arranged separately, are preferably arranged symmetrically. The resilient member 81 is disposed aboce or below the cooled exhaust gas pipes 23 which carry the internal combustion engine 1.

FIG. 8 shows a view in horizontal section through a pre-chamber 99, while FIG. 9 shows a view in vertical section through the heat exchanger for the heat carrier.

The exhaust gases from the internal combustion engine 1 pass through the intake openings 93 into the exhaust gas pre-chamber 99 of the exhaust gas heat exchanger 24, which is defined upwardly and outwardly by a heat carrier pre-chamber 96 and downwardly by a heat carrier post-chamber 97. A switching control flap 101 permits the flow of exhaust gas to be diverted either to the exhaust gas heat exchanger or to the expeller or, in the central position, to both thereof. In the sectors of the two exchanger surfaces which can be in the form for example of tube assemblies or nests, the exhaust gas passes into the spaces disposed under the heat carrier post-chamber 97. After a reversal in direction below separating or partitioning walls 102 and they pass into the exhaust gas evaporator means 22.

The heat carrier flows from the cooling jackets 76 into a heat carrier pre-chamber 96 and on through the cooling pipes 25 which are shown by way of example, by way of a heat carrier post-chamber 97, in the above-described circuit (see FIG. 1). The post-chamber 97 includes a vapour separator or trap.

Figure 10:
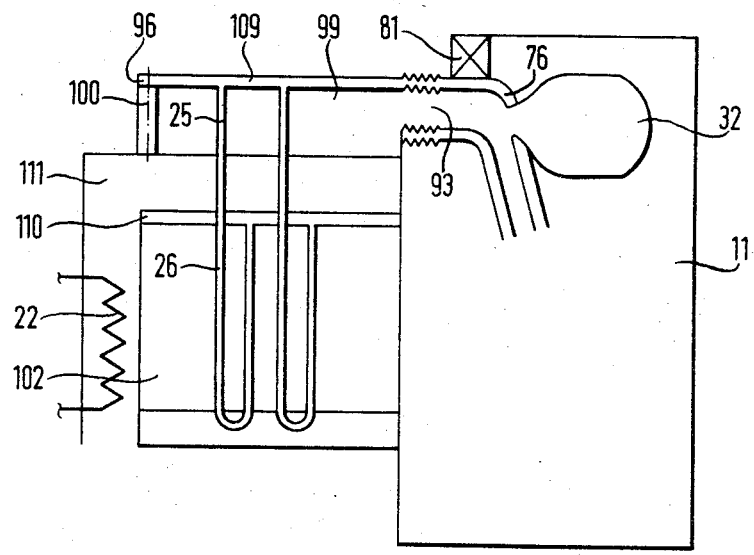

Similarly, the pair of substances of the absorption heat pump passes into the exchanger surface 26, which is shown by way of example as a tube-type heat exchanger, for the expeller (see FIG. 10) and passes into the separator or trap 33 from which the two substances continue their flow in separate circuits.

The arrangement which is illustrated by way of example permits the flow of exhaust gas from the internal combustion engine 1 and also the exhaust gas and radiant heat produced by the auxiliary burner 32 to be fed either to the exhaust gas heat exchanger 25 or the expeller 26, by suitable positioning of the flap 101 or, when the flap 101 is in its central position, to both systems 25 and 26. The flap 101 is mounted movably by means of a shaft 100 and is actuated as desired by a per se known control means.

FIG. 11 shows the arrangement of the devices in the space 87. The internal combustion engine 1 in its engine enclosure 11 are preferably disposed in the lower part of the space 87. The enclosure 11 is only penetrated and sealed off by the output shaft 12 with shaft sealing means 14 and by the discharge openings 93 with compensators 108.

The output shaft 12 is continued by way of the clutch 2 in the shaft line 3 which carries the above-described pieces of equipment. The output shaft 12 and the shaft line 3 are preferably mounted in rolling bearings 113.

The evaporator with the evaporator means 22 for exhaust gas, evaporator 21 for the heat source and evaporator 38 for the absorption heat pump, are rigidly connected to the exhaust gas heat exchanger 24. The exhaust gas flows through an opening 115 which is kept open. The heating jackets 43 are formed by producing a double wall structure.

Also rigidly connected are condensor 19 for the compression heat pump and condensor 36 for the exhaust gas heat pump circuit. The absorber 35 forms the termination of that heat exchanger block.

The connections between the individual heat exchangers are not illustrated, they are preferably disposed laterally beside the heat exchangers.

The heat storage means 17 which is of a trough-like or tank configuration preferably terminates substantially at the level of the upper edge of the heat exchangers. The same also applies with regard to the fuel tank 46, the casing 54 and the jacketing 55. In its upper part, the casing 54 has a damper mat 116 and perforated plate, and there serves as a sound absorption surface.

The air used as the heat source, or combustion air, enters in the gap between the jacketing 55 and the casing and is passed to the blower 10 for example by a feed passage 117.

The cooled and dewatered exhaust gas is discharged from the exhaust gas evaporator means 22 into the space between the lower boundary surface of the heat exchangers or engine enclosure 11 and the inner wall of the heat storage means 17, flows through an exhaust gas passage 118 into the space between the jacketing 55 and the casing 54 which is also again clad with sound-absorbing means, and is discharged therefrom. The waste air from the heat source can be discharged jointly with the combustion air or separately through a laterally disposed discharge opening.

The container or tank 91 for water for industrial use is preferably also of an inverted, tank or trough-like configuration and is fitted sound-tightly and heat-tightly on to the heat storage means 17 and fuel tank 46 respectively. It is preferably arranged to be hinged, in order to be easily opened for emptying. It is protected from heat loss in a per se known manner by insulation 106.

The above-described arrangement ensures ease of accessibility to all pieces of equipment for maintenance and servicing. The internal combustion engine 1, together with its engine enclosure 11, can be removed in an upward direction. The same also applies to the pieces of equipment on the shaft line 3 and also, after removal thereof, to the combined block of all heat exchangers.

We claim:

1. In a heating or cooling apparatus of the type including a housing having therein at least one heat pump, an internal combustion engine for driving said heat pump, a heating circuit, and means for transferring heat from said engine and said heat pump to said heating circuit, the improvement comprising:
   means for preventing gas leaking from said heat pump from contacting said engine and comprising an enclosure surrounding said engine in a gas-tight manner;
   said engine including a crankshaft and a flywheel connected thereto, said crankshaft and flywheel being entirely enclosed within and surrounded by said enclosure;
   drive means for transmitting rotation of said crankshaft to drive said heat pump, said drive means comprising a shaft separate from said crankshaft and connected to said heat pump, said shaft extending rotatably through said enclosure, means for sealing said shaft with said enclosure, and transfer means for imparting rotational movement from said crankshaft to said shaft, thereby driving said heat pump; and
   means for resiliently suspending said engine in said enclosure.

2. The improvement claimed in claim 1, wherein said engine includes cooled exhaust pipes supported by said suspending means.

3. The improvement claimed in claim 2, further comprising auxiliary burner means in one of said exhaust pipes.

4. In a heating or cooling apparatus of the type including a housing having therein at least one heat pump, an internal combustion engine for driving said heat pump, a heating circuit, and means for transferring heat from said engine and said heat pump to said heating circuit, the improvement comprising:
   means for preventing gas leaking from said heat pump from contacting said engine and comprising an enclosure surrounding said engine in a gas-tight manner;
   said engine including a crankshaft and a flywheel connected thereto, said crankshaft and flywheel being entirely enclosed within and surrounded by said enclosure;
   drive means for transmitting rotation of said crankshaft to drive said heat pump, said drive means comprising a shaft separate from said crankshaft and connected to said heat pump, said shaft extending rotatably through said enclosure, means for sealing said shaft with said enclosure, and transfer means for imparting rotational movement from said crankshaft to said shaft, thereby driving said heat pump;

a supply tank within said enclosure for housing a supply of lubricating oil for said engine; and a lubricating oil heat exchanger positioned within said enclosure.

5. The improvement claimed in claim 4, further comprising means connecting said lubricating oil heat exchanger to cylinders and main bearing blocks of said engine.

6. The improvement claimed in claim 5, wherein said connecting means comprises a hollow member defining an oil pump casing.

7. The improvement claimed in claim 6, wherein said hollow member defines means for feeding oil to cylinder heads of said engine.

* * * * *